US011544377B2

(12) United States Patent
Zong et al.

(10) Patent No.: US 11,544,377 B2
(45) Date of Patent: Jan. 3, 2023

(54) UNSUPERVISED GRAPH SIMILARITY LEARNING BASED ON STOCHASTIC SUBGRAPH SAMPLING

(71) Applicant: NEC Laboratories America, Inc., Princeton, NJ (US)

(72) Inventors: Bo Zong, West Windsor, NJ (US); Haifeng Chen, West Windsor, NJ (US); Lichen Wang, Malden, MA (US)

(73) Assignee: NEC Corporation (*) Notice: Subject to any disclaimer, the term of this patent is extended or adjusted under 35 U.S.C. 154(b) by 300 days.

(21) Appl. No.: 17/017,048

(22) Filed: Sep. 10, 2020

(65) Prior Publication Data
US 2021/0089652 A1 Mar. 25, 2021

Related U.S. Application Data

(60) Provisional application No. 62/902,997, filed on Sep. 20, 2019.

(51) Int. Cl.
G06F 21/56 (2013.01)
G06V 10/75 (2022.01)
G06K 9/62 (2022.01)
G06N 3/04 (2006.01)

(52) U.S. Cl.
CPC ........... *G06F 21/56* (2013.01); *G06K 9/6215* (2013.01); *G06K 9/6288* (2013.01); *G06K 9/6296* (2013.01); *G06N 3/049* (2013.01); *G06V 10/751* (2022.01)

(58) Field of Classification Search
CPC .... G06F 21/56; G06V 10/751; G06K 9/6215; G06K 9/6296; G06N 3/049

USPC ......................................................... 726/24
See application file for complete search history.

(56) References Cited

U.S. PATENT DOCUMENTS

2019/0213099 A1* 7/2019 Schmidt .............. G06F 11/3006
2020/0120109 A1* 4/2020 Shu ...................... G06K 9/6201

OTHER PUBLICATIONS

Sanfeliu et al., "A distance measure between attributed relational graphs for pattern recognition", IEEE transactions on systems, man, and cybernetics. vol. 13, No. 3. May 3, 1983. pp. 353-362.
Shervashidze et al., "Weisfeiler-lehman graph kernels", Journal of Machine Learning Research. vol. 12. Sep. 2011. pp. 2539-2561.
Vishwanathan et al., "Graph Kernels", Journal of Machine Learning Research. vol. 11. Apr. 2010. pp. 1201-1242.
Xu et al., "How powerful are graph neural networks?." Conference Paper at ICLR 2019. arXiv:1810.00826v3 [cs.LG]. Feb. 22, 2019. pp. 1-17.

* cited by examiner

*Primary Examiner* — Jeffery A Williams
(74) *Attorney, Agent, or Firm* — Joseph Kolodka

(57) ABSTRACT

Methods and systems for detecting abnormal application behavior include determining a vector representation of a first syscall graph that is generated by a first application, the vector representation including a representation of a distribution of subgraphs of the first syscall graph. The vector representation of the first syscall graph is compared to one or more second syscall graphs that are generated by respective second applications to determine respective similarity scores. It is determined that the first application is behaving abnormally based on the similarity scores, and a security action is performed responsive to the determination that the first application is behaving abnormally.

18 Claims, 8 Drawing Sheets

UNSUPERVISED GRAPH SIMILARITY LEARNING BASED ON STOCHASTIC SUBGRAPH SAMPLING

RELATED APPLICATION INFORMATION

This application claims priority to U.S. Provisional Patent Application No. 62/902,997, filed on Sep. 20, 2019, incorporated herein by reference entirety.

BACKGROUND

Technical Field

The present invention relates to learning similarities between graphs, and, more particularly, to graph similarity learning that uses stochastic subgraph sampling.

Description of the Related Art

Graph data structures represent relational information in a variety of real-life applications. Evaluating the similarity between two graphs, particularly without supervision from pre-defined labels, can be challenging.

SUMMARY

A method for detecting abnormal application behavior includes determining a vector representation of a first syscall graph that is generated by a first application, the vector representation including a representation of a distribution of subgraphs of the first syscall graph. The vector representation of the first syscall graph is compared to one or more second syscall graphs that are generated by respective second applications to determine respective similarity scores. It is determined that the first application is behaving abnormally based on the similarity scores, and a security action is performed responsive to the determination that the first application is behaving abnormally.

A system for detecting abnormal application behavior includes a hardware processor and a memory. The memory is configured to store a computer program that, when executed by the hardware processor, is configured to implement a graph vector model that determines a vector representation of a first syscall graph that is generated by a first application, the vector representation including a representation of a distribution of subgraphs of the first syscall graph. A security console is configured to compare the vector representation of the first syscall graph to one or more second syscall graphs that are generated by respective second applications to determine respective similarity scores, to determine that the first application is behaving abnormally based on the similarity scores, and to perform a security action responsive to the determination that the first application is behaving abnormally.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention may use, for example, inductive and unsupervised graph learning, including, for example, subgraph sampling, subgraph encoding, and subgraph distribution embedding, to identify similarities between graphs.

With subgraph sampling, the present embodiments can use a walk with earliest visit time to make substructure enumeration tractable, with rich loop information included. With subgraph encoding, the present embodiments can efficiently encode sampled subgraphs and represent the subgraphs as vectors. With subgraph distribution embedding, the present embodiments can represent each input graph as a collection of vectors, and then encode the collection of vectors into a single distribution vector. When the underlying vectors of two different graphs are similar, then the graphs' respective distribution vectors are similar to one another. The distance between two graphs can then be estimated using the distance between their respective distribution vectors.

Figure 1:
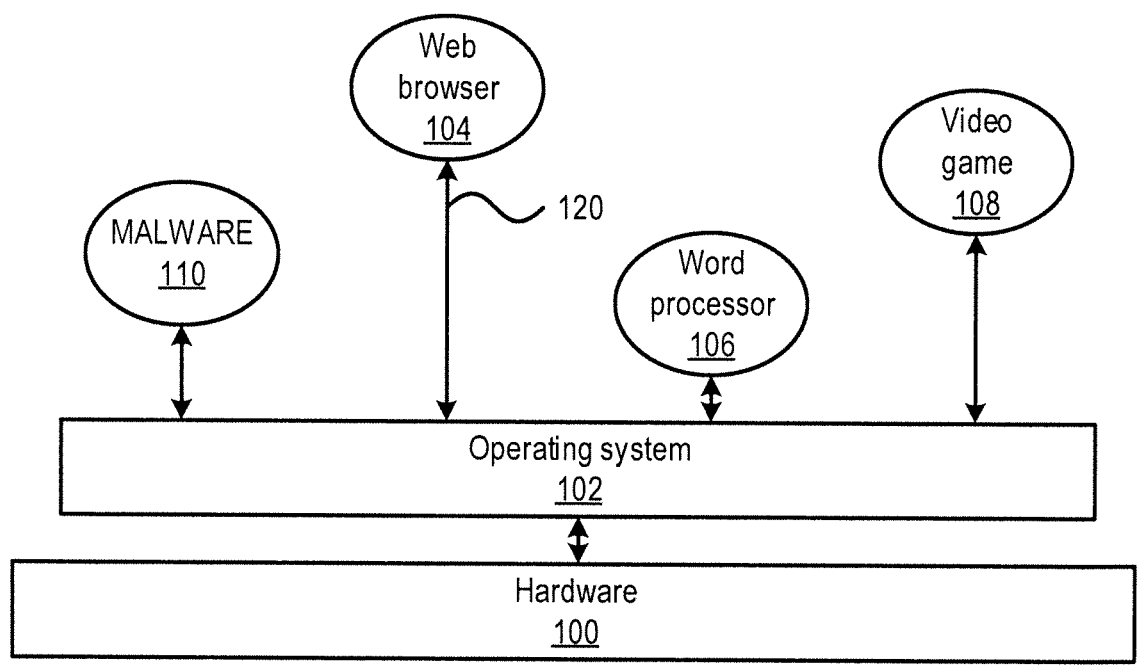
FIG. 1 is a block diagram of a computer system that includes both legitimate applications and malware, in accordance with an embodiment of the present invention.

Referring now to FIG. 1, a diagram of an exemplary computer system is shown. The computer system includes a hardware layer 100, with an operating system 102 that provides an interface between the hardware layer 100 and applications. A variety of legitimate software applications are shown, including a web browser 104, a word processor 106, and a video game 108. These functions are intended to be purely exemplary, and should not be construed as being limiting. Also shown is malware 110. The legitimate applications may be distinguished from the malware 110 in that they may be installed with the consent of the user, and/or perform actions that the user intends, whereas the malware 110 may be installed covertly and may perform actions that are adverse to the user's interests.

Each of the applications, both legitimate and malware, may communicate with the operating system via syscalls

120. These calls can instruct the operating system 102 to perform any appropriate action, for example initiating a process, accessing a file stored on hardware 100, reading and writing data, etc.

Determining graph similarity has a variety of practical applications. In one example, a syscall graph can be generated for the various software applications, with nodes of the syscall graph representing system entities (e.g., processes, files, sockets, etc.), node attributes representing profile information for entities (e.g., entity type, entity life time, etc.), edges representing interactions between entities, and edge attributes representing profile information of interactions (e.g., creating a process, opening a file, etc.). Given a collection of syscall graphs for legitimate software, syscall graphs generated by malware 110 can be detected as being dissimilar from normal and expected graphs. The present embodiments can therefore be employed to identify which syscall graphs are dissimilar to the others, as described in greater detail below.

Figure 2:
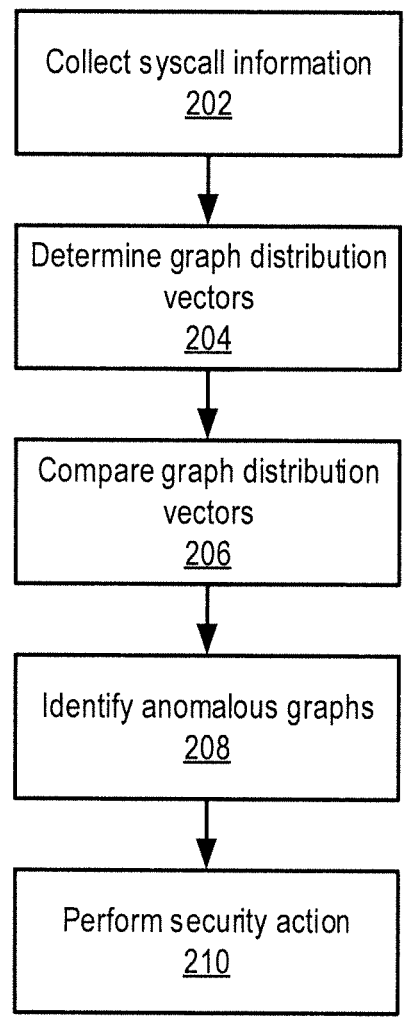
FIG. 2 is a block/flow diagram of a process/system for detecting and responding to applications with abnormal behavior, in accordance with an embodiment of the present invention.

Referring now to FIG. 2, a method of identifying and responding to malware is shown. Block 202 collects syscall information from the applications on a computer system, which includes syscalls 120 from legitimate applications and potentially also syscalls from malware. As noted above, these syscalls 120 can reflect any appropriate action within the computer system, and can include information relating to an originating process, a target, and a type of action. The syscalls 120 can be collected by the operating system 102, or by another application installed on the computer system.

Block 204 determines graph distribution vectors from the syscalls 120, as will be described in greater detail below. Block 206 then compares the graph distribution vectors, using any appropriate similarity metric to generate similarity scores. For example, the cosine similarity can be used to determine the degree to which one graph distribution vector is similar to another. Each graph distribution vector can be compared to every other graph distribution vector, or alternatively only to representative vectors of clusters of graph distribution vectors. To that end, the graph distribution vectors can be clustered using any appropriate clustering process.

Block 208 identifies anomalous graphs, based on the similarity scores of each of the graph distribution vectors. In some embodiments, anomalous graphs may be identified as those that have a graph distribution vector with associated similarity scores that are all below a similarity threshold to the graph distribution vectors of respective other graphs. The below-threshold similarity scores indicate that the graph distribution vector of the anomalous graph does not behave like any other recorded application syscall graph. In some embodiments, a second threshold may be used to characterize further anomalous graphs, representing for example a minimum number of dissimilar graphs, or a maximum number of similar graphs, to qualify as an anomalous graph. In such embodiments, a small number of similar graphs (e.g., other malware processes) may be permitted while still recognizing the graph as being anomalous.

Block 210 then performs a security action, responsive to the detection of one or more anomalous graphs. Because these graphs may correspond to malware, block 210 may, for example, stop the associated process(es), or may quarantine the associated process(es), for example by preventing the processes from accessing other processes or stored information. In some embodiments, the security action may furthermore include creating logs that represent the activities of the identified malware for subsequent analysis. The activities can be analyzed to, for example, identify information that has been leaked (e.g., passwords or other identifying information).

Figure 3:
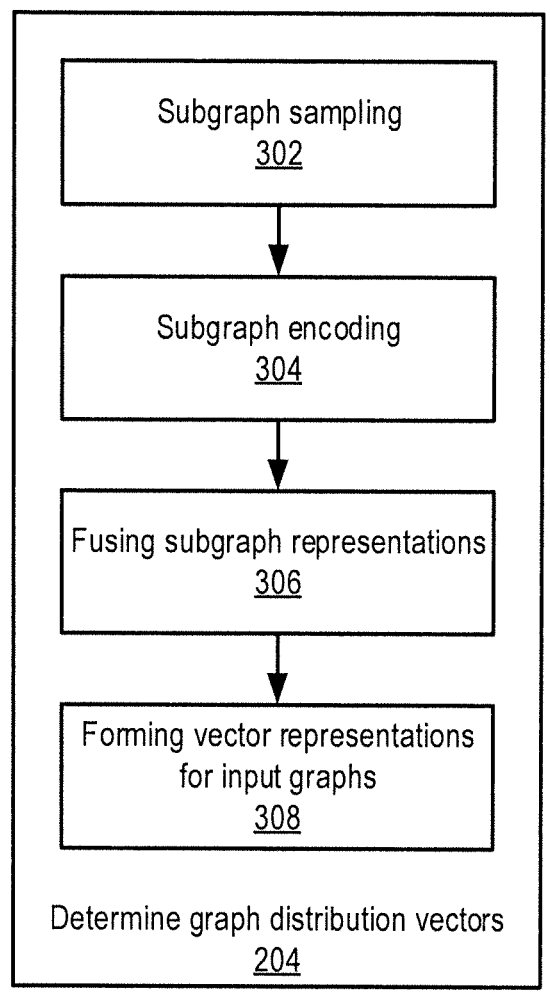
FIG. 3 is a block/flow diagram of determining graph distribution vectors of applications based on syscall graphs, in accordance with an embodiment of the present invention.

Referring now to FIG. 3, additional detail on block 204 is shown. Block 302 performs subgraph sampling, taking the syscall graphs as input and producing respective sets of subgraphs. Each subgraph can be implemented as a walk with earliest visit time, sampling partial information from the input graph, as described in greater detail below.

Block 304 then performs subgraph encoding, using the subgraphs generated by block 302. Sequence encoding, for example, may be used to produce a vector representation of each subgraph. Block 306 then fuses subgraph representations for each input graph into a single respective vector representation, and block 308 forms vector representations for the input graphs, as will be described in greater detail below.

It should be understood that, although the determination of graph distribution vectors in block 204 is described in the specific context of malware detection, these processes can be applied to any appropriate application. For example, any type of abnormal behavior may be detected, for example in the event of a system malfunction or an incorrect input.

Figure 4:
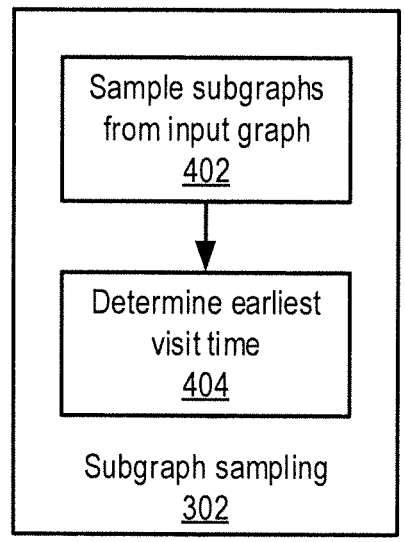
FIG. 4 is a block/flow diagram of subgraph sampling from a syscall graph, in accordance with an embodiment of the present invention.

Referring now to FIG. 4, additional detail is provided regarding subgraph sampling 302. Block 402 samples subgraphs from an input graph. For example, given a fixed length k a walk W can be sampled from an input graph G by randomly selecting a starting node from G, and iteratively then moving from the last node to a random neighbor node, continuing until the length k is reached. The attributes of the walk W can be represented as a sequence $S_a$: $v_0, e_1, v_1, e_2, v_2, \ldots, e_k, v_k$, where $v_i$ represents the node attribute(s) of the $i^{th}$ neighbor node, and $e_i$ represents edge attribute of the $i^{th}$ visited edge.

Block 404 then determines earliest time information for the walk W, for example as a sequence $S_t$: $t_0, t_1, t_2, \ldots, t_k$, where $t_i$ represents the earliest visit time of the $i^{th}$ node during the walk. For example, if a given node n is visited at times 2 and 5, then $t_2=2$ and $t_5=2$. Each walk W is represented by a tuple of the sequence $S_a$ and the sequence $S_t$. In some embodiments, a particular walk can be expressed as a concatenation of two vectors $x^{(p)}=[x_a^{(p)}, x_t^{(p)}]$, where $x_a^{(p)}$ is the attribute information for the node visited at timestamp p, and $x_t^{(p)}$ is the earliest visit time, for example expressed as a one-hot vector.

This walk is distinct from a vanilla random walk in that a vanilla random walk includes coarser-granularity structural information, and have no information about visit history, nor detailed structural information related to loops and circles. In contrast, the walks of the present embodiments may use earliest visit time to preserve loop information in sampled subgraphs, with efficiency that is similar to a vanilla random walk encoding.

Figure 5:
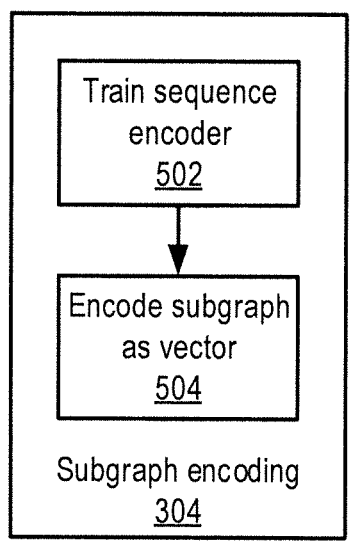
FIG. 5 is a block/flow diagram of encoding subgraphs, in accordance with an embodiment of the present invention.

Referring now to FIG. 5, additional detail is provided regarding subgraph encoding 304. Block 502 trains a sequence encoder using, e.g., an autoencoder system. If $(S_a, S_t)$ is a sampled subgraph, the subgraph may be encoded into a vector z by a function $E_\theta$: $z=E_\theta(S_a, S_t)$. In some embodiments, $E_\theta$ may be implemented as a recurrent neural network. The parameters $\theta$ characterize the behavior of the encoding function $E_\theta$, and may, for example, represent neural network parameters. The vector z representation can be decoded using a decoding function $D_\psi(z)$ to produce decoded subgraph $(S'_a, S'_t)$, where $\psi$ represents parameters of the decoder function. In some embodiments, $D_\psi$ may be implemented as a recurrent neural network. Thus, the subgraphs are encoded and then decoded, providing a decoded subgraph that may differ from the original subgraph.

In this manner, a reconstruction error can be determined as $L=\|(S_a, S_r)-(S'_a,S'_r)\|$. Using, for example, a stochastic gradient descent based on back-propagation, the loss L can be minimized, bringing the decoded subgraph closer to the original subgraph. When a minimized error L has been obtained, the trained encoder function $E_\theta$ can be output. Block 504 then uses the trained encoder $E_\theta$ to encode the input sub-graphs, producing respective subgraph vector representations.

Figure 6:
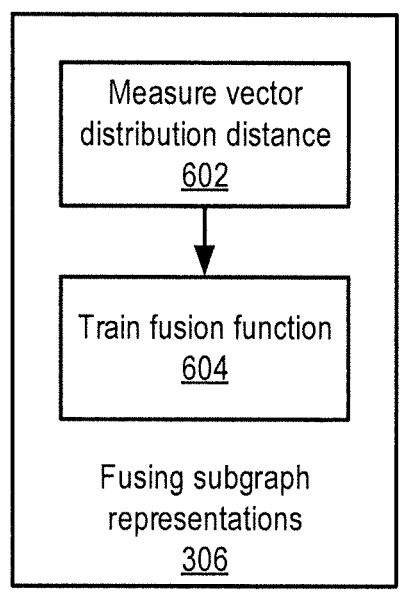
FIG. 6 is a block/flow diagram of fusing subgraph representations into a single syscall graph distribution vector in accordance with an embodiment of the present invention.

Referring now to FIG. 6, additional detail is provided regarding fusing the subgraph representations 306. Block 602 measures the vector distribution distance for a given input, where, for a given pair of input graphs $G_1$ and $G_2$, respective distributions $Q_1$ and $Q_2$ are determined. The distance between $Q_1$ and $Q_2$, which may characterize the similarity of the two graphs, may be determined as, for example, the maximum mean discrepancy (MMD) between the two distributions.

Block 604 then trains the fusion function, for example using a multi-layer neural network to implement a fusion function $F_\varphi$, where $\varphi$ denotes parameters of the network, and where the fusion determines a vector representation of the distribution, $g=F_\varphi(Q)$. To constrain g by the metric, an error value can be defined as:

$$L=\|MMD(Q_1,Q_2)-\|g_1-g_2\|\|$$

where $g_1$ and $g_2$ are the respective fused vectors for $Q_1$ and $Q_2$. Using a stochastic gradient-based back-propagation training process, block 604 can optimize $F_\varphi$ by minimizing L. Then, using the trained fusion function, a single vector representation for each input graph can be obtained.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 7:
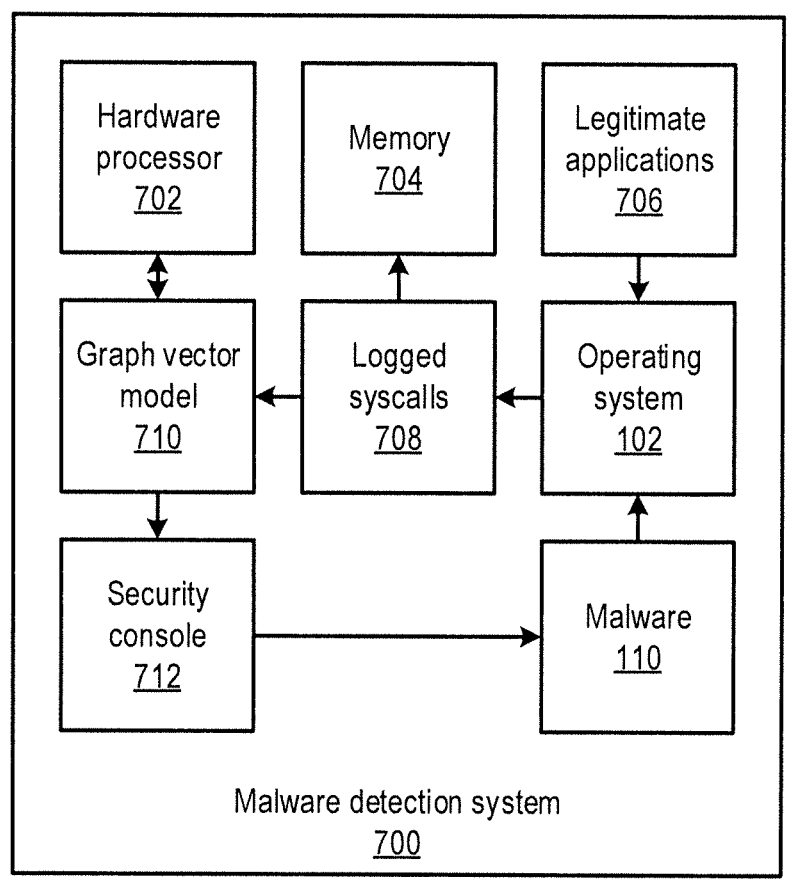
FIG. 7 is a block diagram of a malware detection system that compares application syscall graph distribution vectors to identify and respond to abnormal application behavior, in accordance with an embodiment of the present invention.

Referring now to FIG. 7, a malware detection system 700 is shown. The system 700 includes a hardware processor 702 and a memory 704. An operating system 102 runs using the hardware processor 702 and the memory 704, and provides an interface between the hardware and legitimate applications 706. Malware 110 may also be present, and may also use the operating system 102 for unintended and undesirable purposes.

The operating system 102 logs information from the legitimate applications 706 and the malware 110, for example in the form of syscalls 708, which may be stored in the memory 704. A graph vector model 710 uses graphs formed by the syscalls 708 to represent the processes of the legitimate applications 706 and the malware 110 as vectors. A security console 712 uses the vectors to identify abnormal application behavior, for example by identifying syscall graph vectors that are dissimilar to the vectors of legitimate applications 706.

Upon detection of an abnormal process, the security console 712 may automatically take a variety of responsive actions. For example, the security console 712 may halt the malware 110, or may quarantine it, so that its syscalls can still be recorded for analysis without being able to access sensitive data or processes. The security console 712 can further provide an alert to a user or system administrator, and can perform additional security analysis on the malware 110 to identify its origin.

It should be understood that, although this embodiment shows the graph vector model 710 and the security console 712 as being implemented on the same system as the operating system 102 and the malware 110, it should be understood these can be implemented in a different hardware system, for example in a remote security monitoring system that manages an entire network of computer systems. In such embodiments, the logged syscalls 708 may be forwarded to the remote security monitoring system, and the remote security monitoring system may issue security action instructions to a local security agent on the monitored system.

In some embodiments, the graph vector model 710 may be implemented as an artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 8:
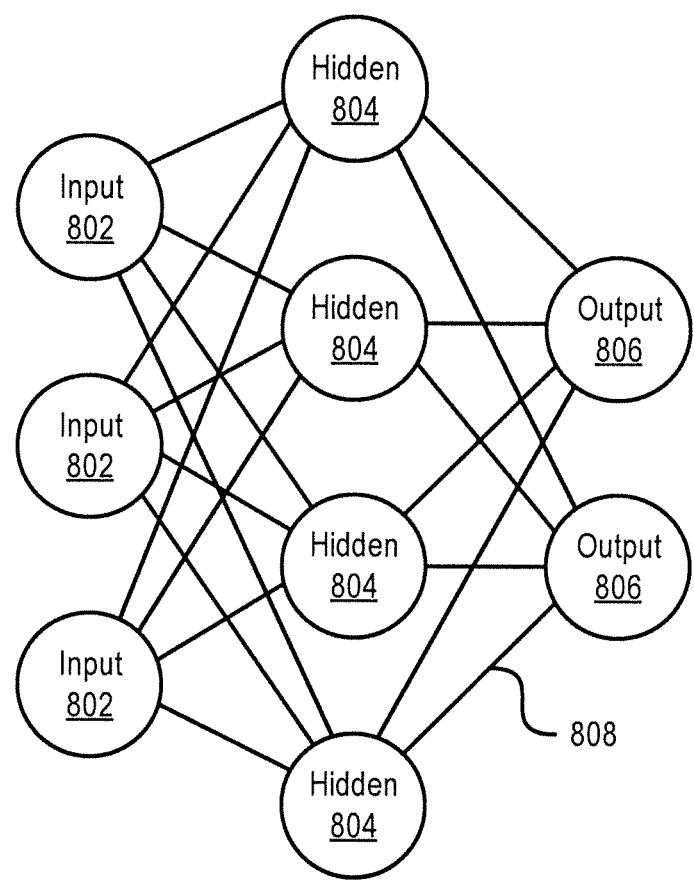
FIG. 8 is a diagram of an exemplary high-level neural network, in accordance with an embodiment of the present invention.

Referring now to FIG. 8, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 802 that provide information to one or more "hidden" neurons 804. Connections 808 between the input neurons 802 and hidden neurons 804 are weighted and these weighted inputs are then processed by the hidden neurons 804 according to some function in the hidden neurons 804, with weighted connections 808 between the layers. There may be any number of layers of hidden neurons 804, and as well as neurons that perform different functions. There exist different neural network structures as well, such as convolutional neural network, maxout network, etc. Finally, a set of output neurons 806 accepts and processes weighted input from the last set of hidden neurons 804.

This represents a "feed-forward" computation, where information propagates from input neurons 802 to the output neurons 806. Upon completion of a feed-forward computation, the output is compared to a desired output available from training data. The error relative to the training data is then processed in "feed-back" computation, where the hidden neurons 804 and input neurons 802 receive information regarding the error propagating backward from the output neurons 806. Once the backward error propagation has been completed, weight updates are performed, with the weighted connections 808 being updated to account for the received error. This represents just one variety of ANN.

Figure 9:
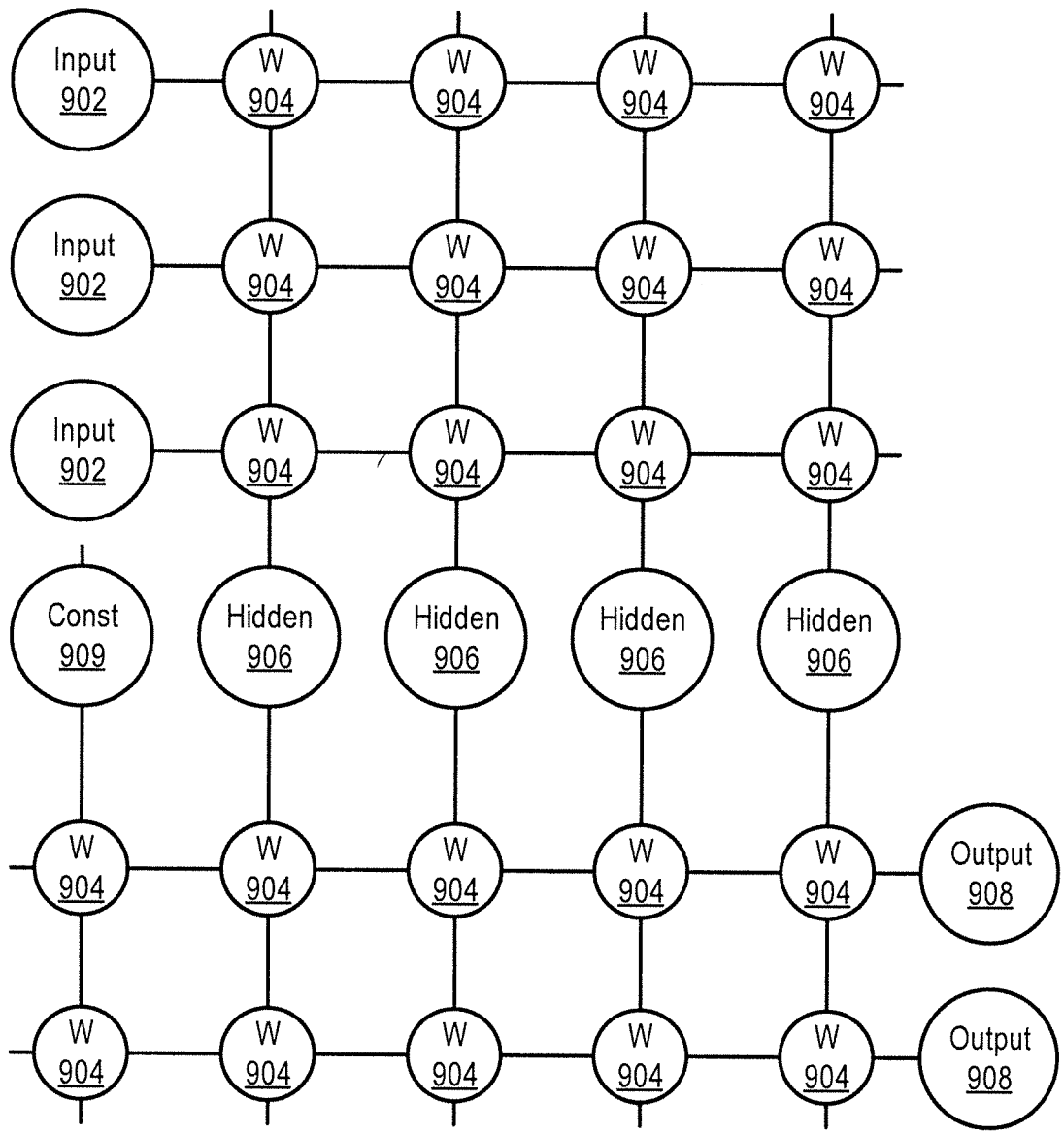
FIG. 9 is a diagram of an implementation of the exemplary high-level neural network, in accordance with an embodiment of the present invention.

Referring now to FIG. 9, an artificial neural network (ANN) architecture 900 is shown. It should be understood that the present architecture is purely exemplary, and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 902 each provide an input signal in parallel to a respective row of weights 904. The weights 904 each have a respective settable value, such that a weight output passes from the weight 904 to a respective hidden neuron 906 to represent the weighted input to the hidden neuron 906. In software embodiments, the weights 904 may simply be represented as coefficient values that are multiplied against the relevant signals. The signals from each weight adds column-wise and flows to a hidden neuron 906.

The hidden neurons 906 use the signals from the array of weights 904 to perform some calculation. The hidden neurons 906 then output a signal of their own to another array of weights 904. This array performs in the same way, with a column of weights 904 receiving a signal from their respective hidden neuron 906 to produce a weighted signal output that adds row-wise and is provided to the output neuron 908.

It should be understood that any number of these stages may be implemented, by interposing additional layers of arrays and hidden neurons 906. It should also be noted that some neurons may be constant neurons 909, which provide a constant output to the array. The constant neurons 909 can be present among the input neurons 902 and/or hidden neurons 906 and are only used during feed-forward operation.

During back propagation, the output neurons 908 provide a signal back across the array of weights 904. The output layer compares the generated network response to training data and computes an error. The error signal can be made proportional to the error value. In this example, a row of weights 904 receives a signal from a respective output neuron 908 in parallel and produces an output which adds column-wise to provide an input to hidden neurons 906. The hidden neurons 906 combine the weighted feedback signal with a derivative of its feed-forward calculation and stores an error value before outputting a feedback signal to its respective column of weights 904. This back propagation travels through the entire network 900 until all hidden neurons 906 and the input neurons 902 have stored an error value.

During weight updates, the stored error values are used to update the settable values of the weights 904. In this manner the weights 904 can be trained to adapt the neural network 900 to errors in its processing. It should be noted that the three modes of operation, feed forward, back propagation, and weight update, do not overlap with one another.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting abnormal application behavior, comprising:
    determining a vector representation of a first syscall graph that is generated by a first application, the vector representation including a representation of a distribution of subgraphs of the first syscall graph;
    comparing the vector representation of the first syscall graph to one or more second syscall graphs that are generated by respective second applications to determine respective similarity scores;
    determining that the first application is behaving abnormally based on the similarity scores; and
    performing a security action responsive to the determination that the first application is behaving abnormally.

2. The method of claim 1, wherein determining the vector representation of the first syscall graph includes sampling a plurality of sub-graphs from the first syscall graph.

3. The method of claim 2, wherein sampling the plurality of sub-graphs from the first syscall graph includes performing a walk with earliest visit time.

4. The method of claim 2, wherein determining the vector representation of the first syscall graph further includes encoding each of the plurality of sub-graphs as a vector.

5. The method of claim 4, wherein encoding each of the plurality of sub-graphs as a vector uses an encoding function that is implemented as a recurrent neural network.

6. The method of claim 5, wherein the recurrent neural network is trained using an autoencoder system.

7. The method of claim 4, wherein determining the vector representation of the first syscall graph further includes fusing multiple subgraph vectors into a single vector representation for the first syscall graph.

8. The method of claim 1, determining that the first application is behaving abnormally includes determining that the first application has a below-threshold similarity to the second applications.

9. The method of claim 1, wherein the security action includes an action selected from the group consisting of terminating the first application, quarantining the first application, and performing a security analysis on the first application.

10. A system for detecting abnormal application behavior, comprising:
    a hardware processor;
    a memory, configured to store a computer program that, when executed by the hardware processor, is configured to implement a graph vector model that determines a vector representation of a first syscall graph that is generated by a first application, the vector representation including a representation of a distribution of subgraphs of the first syscall graph; and
    a security console, configured to compare the vector representation of the first syscall graph to one or more second syscall graphs that are generated by respective second applications to determine respective similarity scores, to determine that the first application is behaving abnormally based on the similarity scores, and to perform a security action responsive to the determination that the first application is behaving abnormally.

11. The system of claim 10, wherein the graph vector model is further configured to sample a plurality of sub-graphs from the first syscall graph.

12. The system of claim 11, wherein the graph vector model is further configured to perform a walk with earliest visit time.

13. The system of claim 11, wherein the graph vector model is further configured to encode each of the plurality of sub-graphs as a vector.

14. The system of claim 13, wherein the graph vector model is further configured to use an encoding function that is implemented as a recurrent neural network.

15. The system of claim 14, wherein the recurrent neural network is trained using an autoencoder system.

16. The system of claim 13, wherein the graph vector model is further configured to fuse multiple subgraph vectors into a single vector representation for the first syscall graph.

17. The system of claim 10, wherein the security console is further configured to determine that the first application has a below-threshold similarity to the second applications.

18. The system of claim 10, wherein the security console is further configured to perform a security action that includes one or more actions selected from the group consisting of termination of the first application, quarantine of the first application, and a security analysis on the first application.

* * * * *